(12) United States Patent
Tiberghien et al.

(10) Patent No.: US 9,360,142 B2
(45) Date of Patent: Jun. 7, 2016

(54) FEMALE QUICK COUPLING ELEMENT AND QUICK COUPLING INCLUDING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR); Frederic Morel, Lathuile (FR)

(73) Assignee: STAUBLI FAVERGES, Faverges (FR)

( * ) Notice: Subject to any disclaimer, the term of this patent is extended or adjusted under 35 U.S.C. 154(b) by 36 days.

(21) Appl. No.: 14/308,466

(22) Filed: Jun. 18, 2014

(65) Prior Publication Data
US 2015/0001844 A1    Jan. 1, 2015

(30) Foreign Application Priority Data

Jun. 28, 2013    (FR) ...................................... 13 56290

(51) Int. Cl.
| | |
|---|---|
| *F16L 37/08* | (2006.01) |
| *F16L 37/24* | (2006.01) |
| *F16L 37/084* | (2006.01) |
| *F16L 37/248* | (2006.01) |
| *F16L 37/252* | (2006.01) |
| *F16L 37/36* | (2006.01) |
| *F16L 37/44* | (2006.01) |

(52) U.S. Cl.
CPC ............. *F16L 37/0841* (2013.01); *F16L 37/24* (2013.01); *F16L 37/248* (2013.01); *F16L 37/252* (2013.01); *F16L 37/36* (2013.01); *F16L 37/44* (2013.01)

(58) Field of Classification Search
CPC ..... F16L 37/0841; F16L 37/24; F16L 37/248; F16L 37/252; F16L 37/36; F16L 37/44
USPC ................................ 137/614.03–614.05, 798
See application file for complete search history.

(56) References Cited

U.S. PATENT DOCUMENTS

| | | | | |
|---|---|---|---|---|
| 5,009,252 | A * | 4/1991 | Faughn ................. | F16L 37/113 137/614.04 |
| 8,387,949 | B2 * | 3/2013 | Ekstrom ............... | F16L 37/252 137/614.03 |
| 8,899,550 | B2 * | 12/2014 | Tiberghien .............. | F16L 31/00 137/614.04 |

FOREIGN PATENT DOCUMENTS

| | | |
|---|---|---|
| EP | 0843122 A2 | 5/1998 |
| GB | 691568 | 5/1953 |

*Primary Examiner* — Kevin Lee
(74) *Attorney, Agent, or Firm* — Dowell & Dowell, P.C.

(57) ABSTRACT

This female quick coupling (2) element (10) is intended to cooperate, by press fitting (F1) along a press fitting axis (X10-X20), with a male element (20). It comprises a body (102) centred on a longitudinal axis (X10) of the passage of fluid and comprising a flat front face (108), a relief valve (120) comprising a valve (110) housed in the duct for the passage of fluid and mobile along the longitudinal axis, a manoeuvring ring (130) mounted slidingly around the body and defining, at its distal end (134), a mouth (E10) for receiving the male element. The manoeuvring ring is provided with at least one relief (136) of engagement with a corresponding relief (226) of the male element. The female coupling element further comprises a safety ring (150) mounted around the body (102), radially inside the manoeuvring ring (130), mobile axially in relation to the body (102) between a first position and a second position. The female element further comprises means (170, 158) for transforming, when the safety ring (150) is in its second position, a movement of rotation of the manoeuvring ring, about the longitudinal axis (X10) and in relation to the safety ring (150), into a movement of axial translation of the body (102) in relation to the manoeuvring ring (130).

22 Claims, 7 Drawing Sheets

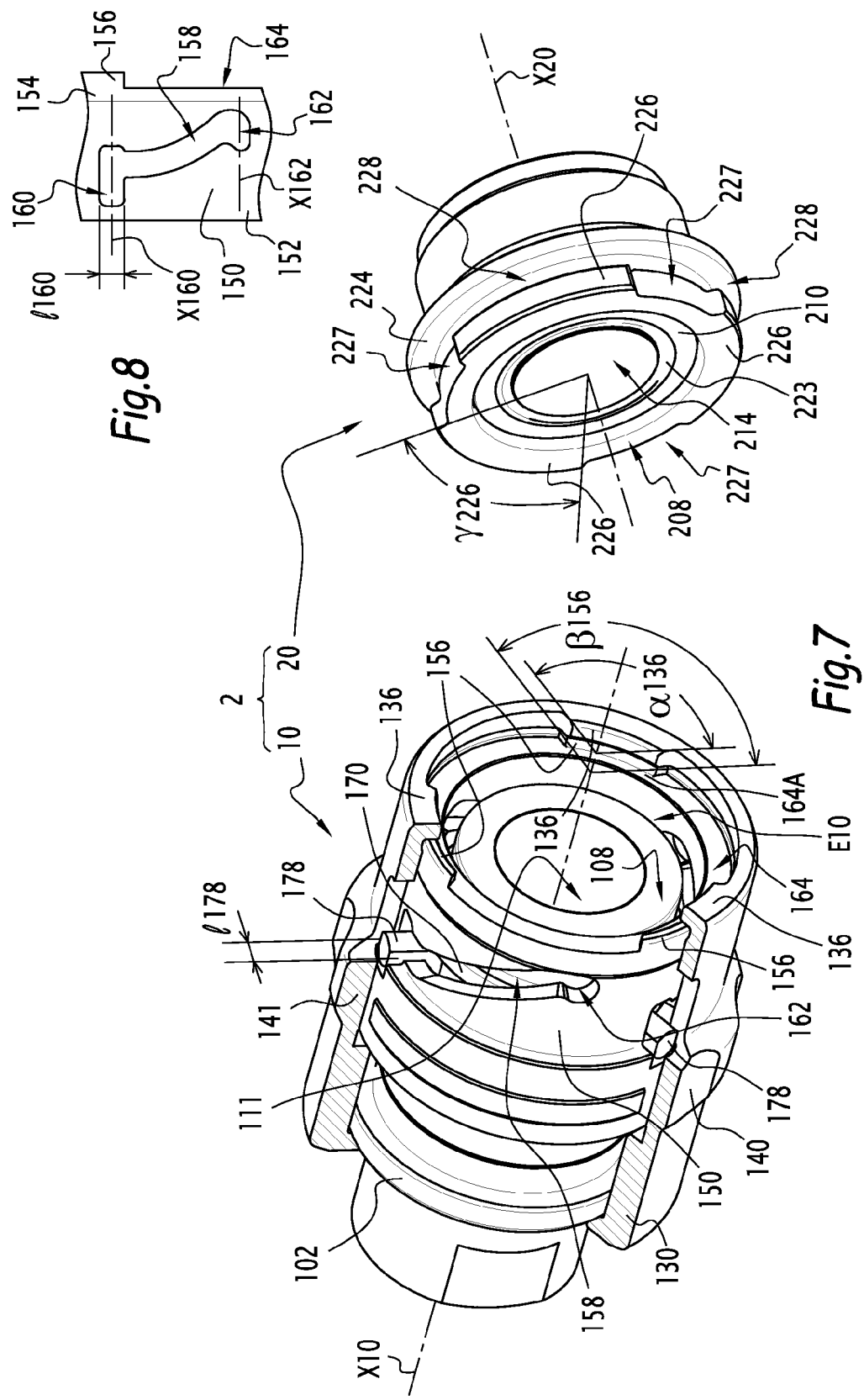

FEMALE QUICK COUPLING ELEMENT AND QUICK COUPLING INCLUDING SUCH AN ELEMENT

BACKGROUND OF THE INVENTION

The invention relates to a female quick coupling element intended to cooperate, by press fitting, with a corresponding male element.

In the field of distributing gaseous or liquid fluids to an automobile, railway or aeronautical vehicle, it is known to use a quick coupling to connect a supply circuit belonging to a fixed station to a distribution circuit incorporated into the vehicle. In general, a male element of a quick coupling is mounted on the vehicle while a female element of this coupling belongs to the fixed station. This type of application entails constraints on the quick coupling in terms of encumbrance, of the flow to be provided and of manoeuvrability. In particular, it is desirable to limit leakage of fluid and to provide a flow that is sufficient for a quick transfer of the quantity of fluid required for the vehicle.

It is known in GB-A-691 568 to integrate a valve inside the body of a female coupling element and to guide this valve both in translation and in rotation when it is separated from its seat, by means of rollers inserted into helical grooves. The elements for guiding the valve in its helical movement obstruct the fluid stream, i.e. the volume normally intended for the flow of the fluid inside the coupling when these male and female elements are coupled. This limits the flow of the fluid and creates losses of load. Furthermore, relatively long movements, according to an axial direction, are required to guide the connection parts of the male and female elements in relation to one another during the coupling of the element of the coupling.

Moreover, the constraints mentioned hereinabove concerning the distribution of fluid to a vehicle can be found in other application fields.

It is these constraints that the invention intends more particularly to overcome by proposing a new quick coupling element which is compact, easily manoeuvrable and of which the fluid stream is not obstructed by elements for guiding a valve.

BRIEF SUMMARY OF THE INVENTION

To this effect, the invention relates to a female quick coupling element intended to cooperate, by press fitting along a press fitting axis, with a male quick coupling element and comprising:
- a body centred on a longitudinal axis, defining a duct for the passage of fluid and comprising, at its distal end, a flat front face,
- a relief valve comprising a valve lodged in the duct for the passage of fluid and mobile along the longitudinal axis in relation to the body, between a closed position of the relief valve, abutting against a seat of the relief valve, and an open position of the relief valve, separated from the seat,
- a manoeuvring ring mounted slidingly around the body and defining, at its distal end, a mouth for receiving the male element, with the ring being provided with at least one relief of engagement with a corresponding relief of the male element, characterised in that the female coupling element further comprises
- a safety ring mounted around the body, radially inside the manoeuvring ring, with the safety ring being axially mobile in relation to the body between a first position, wherein the manoeuvring ring and the safety ring are integral in rotation about the longitudinal axis, and a second position wherein the manoeuvring ring can rotate about the longitudinal axis in relation to the safety ring,
- means of transforming, when the safety ring is in its second position, a movement of rotation of the manoeuvring ring about the longitudinal axis and in relation to the safety ring, into a movement of axial translation of the body in relation to the manoeuvring ring.

Thanks to the invention, the safety ring guarantees, as long as it is in its first position, that the body of the female element cannot be driven axially due to the rotation of the manoeuvring ring, rotation which is possible when the safety ring is in its second position. In other terms, the displacement of the body of the female element is not possible until starting with the second position of the safety ring, which prevents a premature displacement of the body of the female element and consequently limits the risks of a leak.

According to advantageous but not mandatory aspects of the invention, such a female element can incorporate one or several of the following characteristics, taking in any technical admissible combination:
- The means for transforming movement comprise a drive ring mounted mobile in rotation and integral in translation around a body, while one of the rings, among the manoeuvring ring and the drive ring, is provided with at least one member for fastening in rotation of the drive ring with the manoeuvring ring, with the possibility of relative axial movement, and one of the rings among the drive ring and the safety ring is provided with at least one member for guiding the drive ring in a helical movement in relation to the safety ring.
- The means for transforming movement comprise a drive ring mounted mobile in rotation and integral in translation around the body, while one of the rings, among the safety ring and the drive ring, is provided with at least one member for fastening in rotation of the drive ring with the safety ring with the possibility of relative movement, and one of the rings among the drive ring and the manoeuvring ring is provided with at least one member for guiding the drive ring in a helical movement in relation to the manoeuvring ring.
- The member for fastening in rotation and the member for guiding are integral or monoblock with the same ring.
- The member for fastening in rotation and the member for guiding are confounded into the same member. Alternatively, the member for fastening in rotation and the member for guiding are two separate members.
- The member for fastening in rotation and the member for guiding are integral or monoblock with two separate rings, among the manoeuvring ring, the safety ring and the drive ring.
- The member for fastening in rotation is a pin integral or monoblock with one of the rings and engaged in a groove at least in the longitudinal portion of another of the rings, parallel to the longitudinal axis of the body, and the member for guiding is a pin integral or monoblock with one of the rings and engaged in a helical groove of another of the rings.
- In the first position of the safety ring, the pin for fastening in rotation and guiding is engaged in a notch that extends the helical groove and which extends parallel to the longitudinal axis of the body.
- The female element comprises means of elastically returning the safety ring towards its first position.

When the safety ring is in its second position and as long as the manoeuvring ring has not rotated about the longitudinal axis in relation to its angular position with regards to the safety ring when the safety ring is in its first position, a distal end of the safety ring protrudes beyond the front face of the body.

The valve is provided with a flat front face flush with the flat front face of the body when the valve is in closed position of the relief valve.

The seat is formed by an internal tapered surface of the body, converging towards the longitudinal axis in the direction of the front of the female element.

The invention also relates to a quick coupling for the joining of two fluid pipes which comprises a female element such as mentioned hereinabove as well as a male element complementary with this female element.

Such a coupling, which can in practice be of the quarter-turn type, is easier to use and more compact than those of prior art.

According to advantageous but not mandatory aspects of the invention, such a quick coupling can incorporate one or several of the following characteristics:

The male element comprises a second body centred on a second longitudinal axis and defining a second duct for the passage of fluid, a second relief valve comprising a second valve lodged in the second duct for the passage of fluid and mobile along the second longitudinal axis in relation to the second body, between a closed position of the second relief valve, abutting against a seat of the second relief valve formed by the second body, and an open position of the second relief valve, separated from the seat, while the second body is provided with at least one relief for immobilising in rotation the safety ring, during the press fitting of male and female elements and in coupled configuration.

The second body comprises several reliefs in the form of radial notches arranged on the outside of the body.

The coupling comprises means of viewing the axial position of the safety ring and of the body of the female element in relation to the second body of the male element, through the manoeuvring ring.

The manoeuvring ring is provided with a cross-through hole wherein is engaged the member for fastening in rotation and/or the guiding member in rotation, with the possibility of displacement of each member engaged in the cross-through hole according to the position of the safety ring and of the body of the female element in relation to the second body of the male element.

The manoeuvring ring of the female element comprises at least one relief for hooking on the male element, while the male element defines a volume for receiving the relief for hooking the manoeuvring ring, with the possibility of relative rotation of the manoeuvring ring and of the male element about the press fitting axis.

When the safety ring is in its second position and as long as the manoeuvring ring has not rotated about the longitudinal axis of the body of the female element in relation to the angular position with regards to the safety ring when the safety ring is in its first position, the safety ring constitutes an abutment to the coming together of the manoeuvring ring and of the male element.

The safety ring is provided with at least one relief for immobilising in rotation in relation to the male element.

The safety ring is provided with several teeth forming a relief for immobilising, extending axially from a front edge of the safety ring and which are intended to be engaged in hollow spaces of the radial notches of the male element.

The second valve is provided with a seal that receives as abutment the front face of the body of the female element in coupled configuration of the male and female elements.

The male element comprises a central plunger provided with a flat face flush with a flat front face of a second valve of the male element when this second valve is in a closed position of a second relief valve of the male element, this central plunger being intended to push back the valve of the female element during coupling and in coupled configuration of the male and female elements.

BRIEF DESCRIPTION OF THE SEVERAL VIEWS OF THE DRAWINGS

The invention shall be better understood and other advantages of the latter shall appear more clearly in light of the following description of four embodiments of the invention, provided solely by way of example and made in reference to the annexed drawings wherein:

FIG. 7 is a perspective view of the male and female elements of the coupling according to two different angles with partial detaching of the female element;

FIG. 8 is a partial developed view of a safety ring of the coupling of FIGS. 1 to 7;

DETAILED DESCRIPTION OF THE INVENTION

Figure 1:
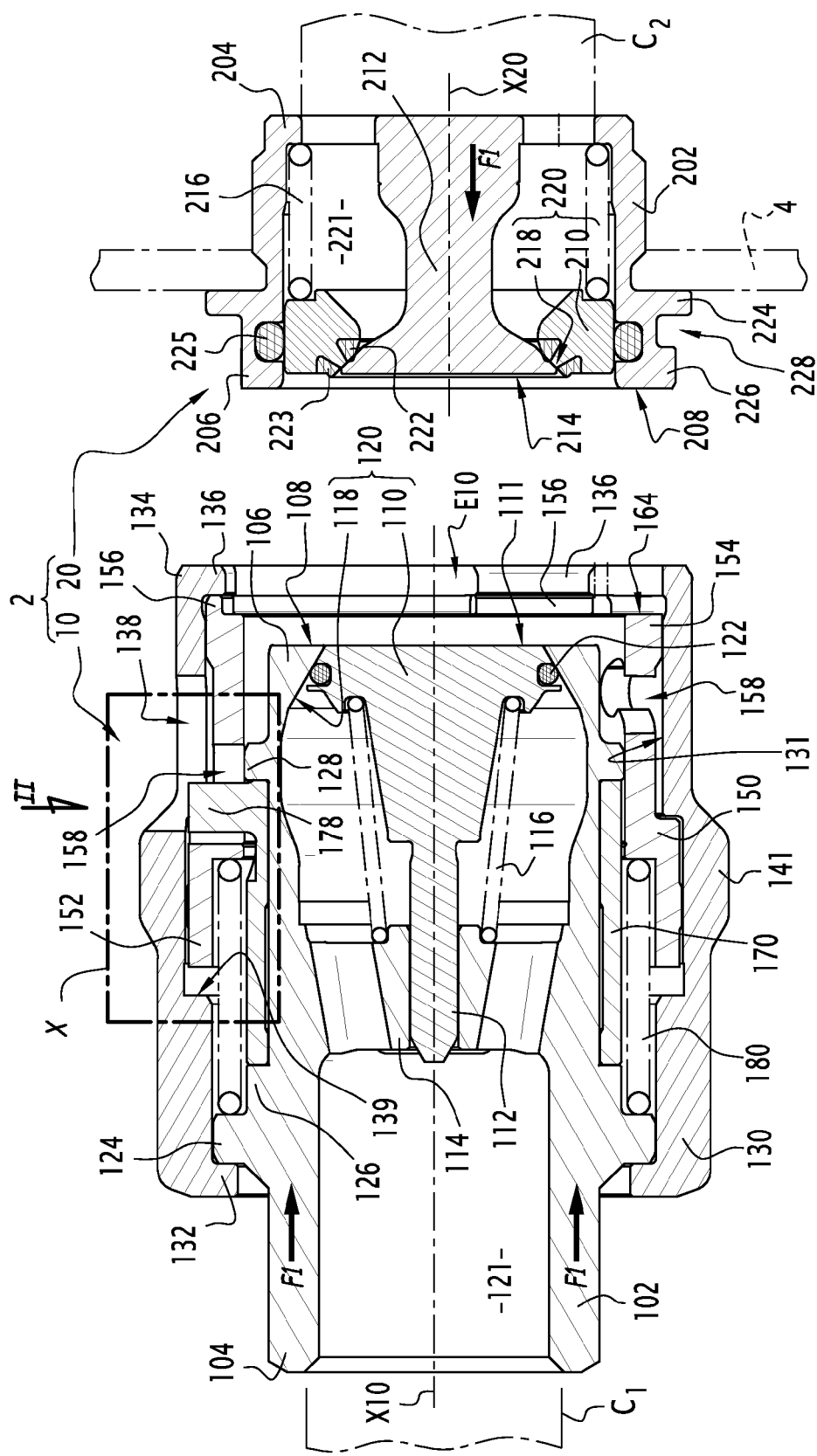
FIG. 1 is a block longitudinal cross-section of a quick coupling in accordance with the invention incorporating a female element also in accordance with the invention.
Figure 3:
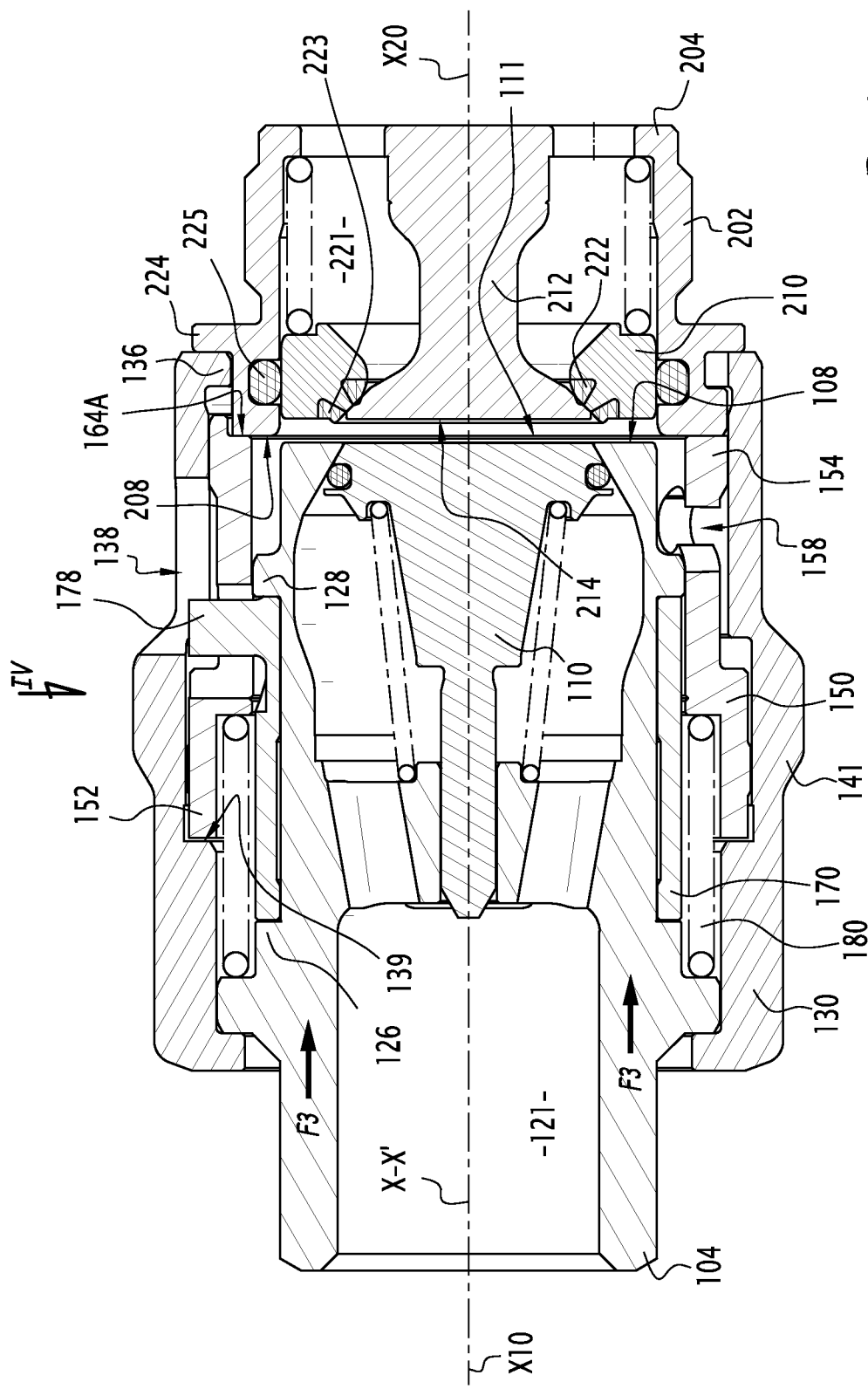
FIG. 3 is a cross-section similar to FIG. 1 when the male and female elements of the coupling are in the process of coupling.
Figure 5:
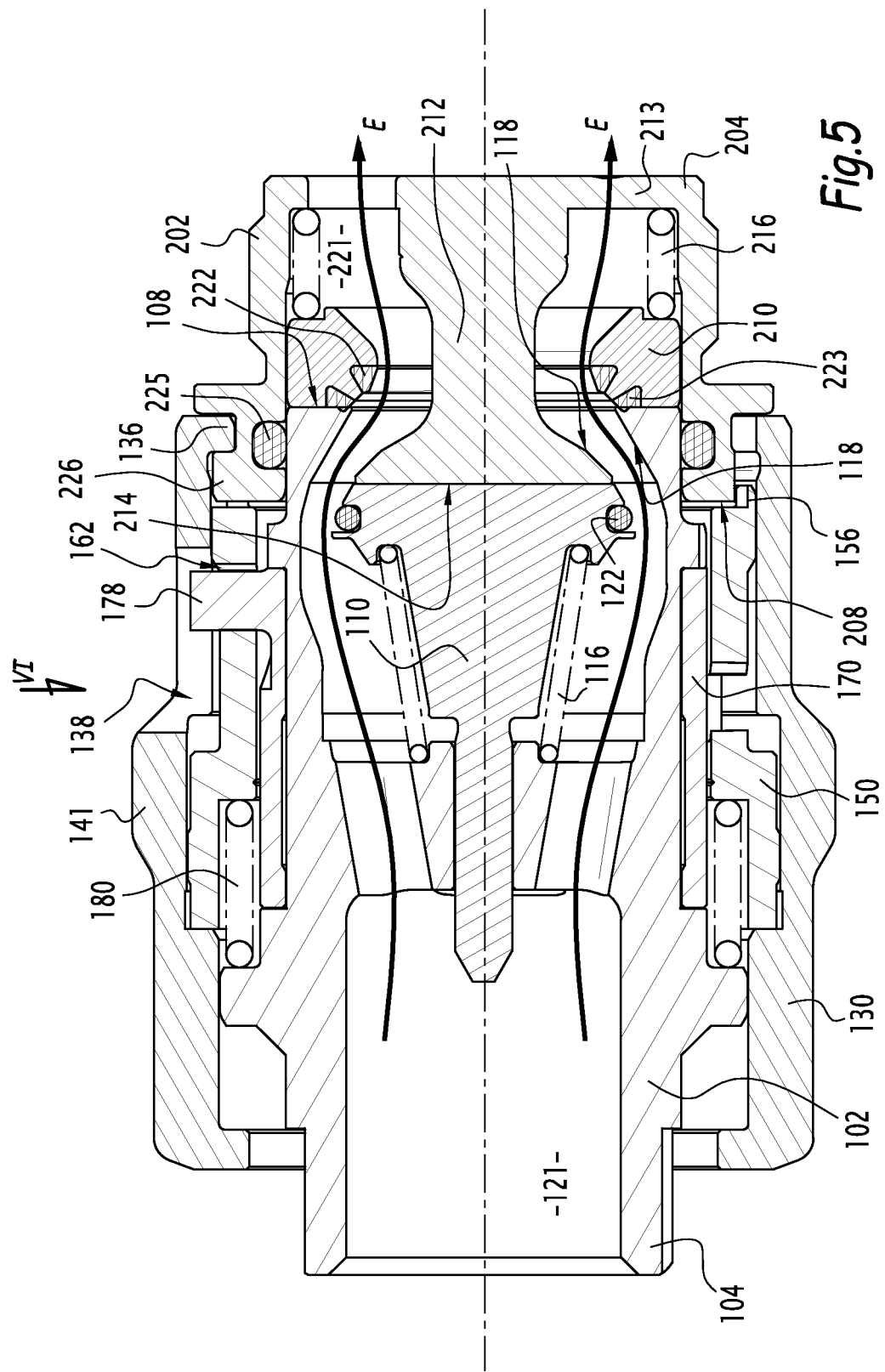
FIG. 5 is a cross-section of the coupling in coupled configuration.
Figure 9:
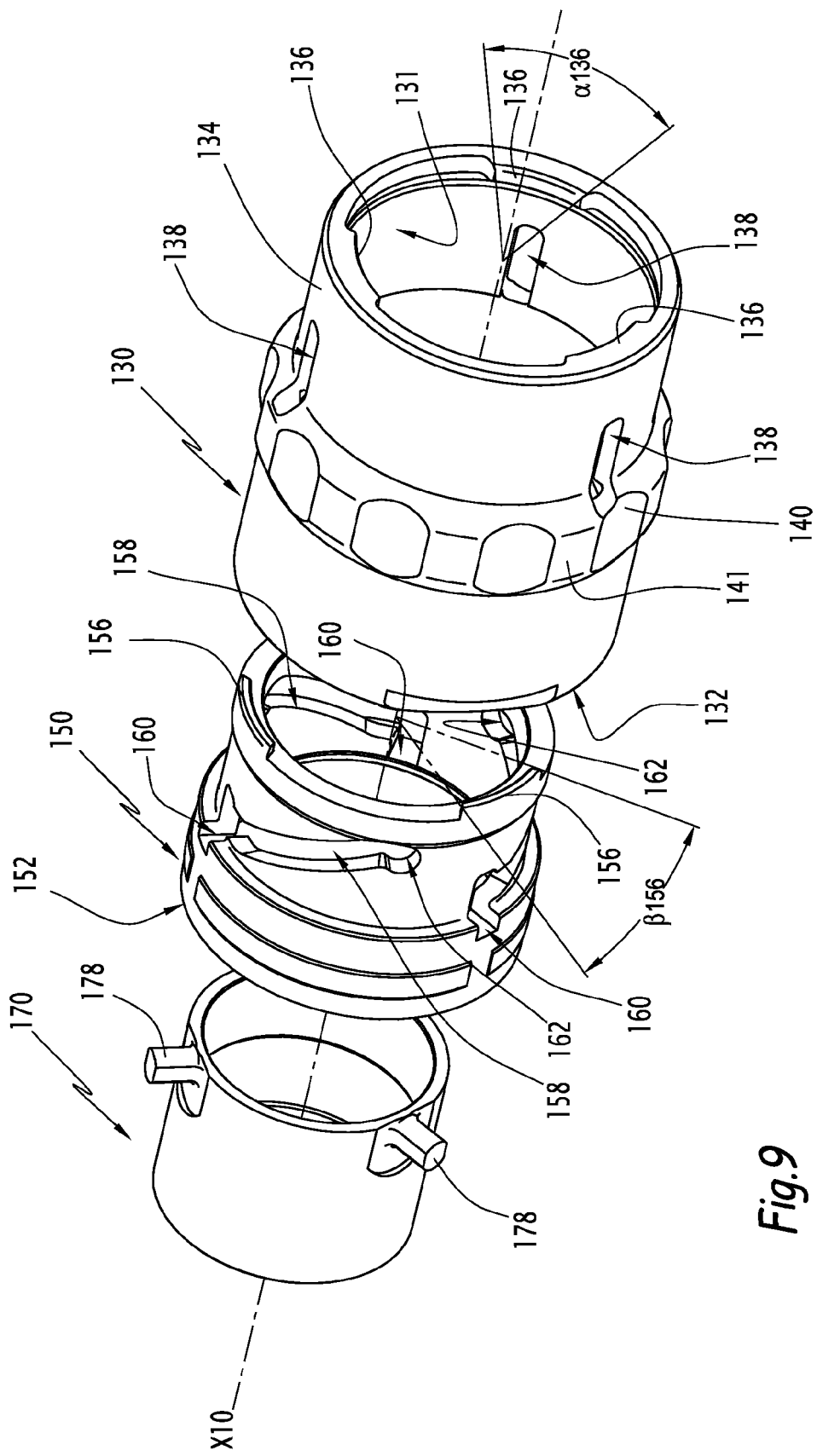
FIG. 9 is an exploded perspective view of three rings belonging to the female element shown in FIGS. 1 to 8.

The cut plane in FIG. 5 is different from that of the FIGS. 1 and 3 as these cut planes intersect a pin 178 which, in the configuration of FIG. 5, has an angular position different from its position in the configuration of FIGS. 1 and 3, about a press fitting axis X-X' of the elements of the coupling.

The coupling 2 shown in FIGS. 1 to 8 comprises a female element 10 and a male element 20 connected respectively to an upstream pipe $C_1$ and to a downstream pipe $C_2$. For the clarity of the drawing, the pipes $C_1$ and $C_2$ are shown, as a chain-dotted line, solely in FIG. 1.

Alternatively, the pipe $C_2$ can be an upstream pipe for the coupling 2, while the pipe $C_1$ is a downstream pipe.

The tip or male element 20 is intended to be integrated into a vehicle, for example an automobile vehicle, by being mounted in a partition 4 of this vehicle which, also for the clarity of the drawing, is shown only in FIG. 1, as a chain-dotted line.

The female element 10 comprises a body 102 which is shown as a monoblock in the figures but which can, in practice, be formed of several portions assembled by screwing or by another technique.

The front of the female element 10 is defined as the side of this female element directed opposite the pipe $C_1$, i.e. in the direction of the male element 20 when the elements of the coupling 2 are arranged facing one another for the purposes of their coupling as shown in FIG. 1. The body 102 is therefore provided with a proximal and 104 in relation to the pipe $C_1$ and with a distal end 106 that defines a flat and annular front face 108 of the body 102.

A valve 110 is lodged inside the body 102 and mounted slidingly in the latter, along the axis X10. The valve 110 is provided with a rod 112 engaged in a guide bushing 114 belonging to the body 102 and which makes it possible to guide the valve 110 in translation along the axis X10. The valve 110 is loaded elastically by a spring 116 in the direction of a seat 118 formed by an internal tapered surface of the distal end 106 that converges towards the front, i.e. by moving away from the end 104. The valve 110 and the seat 118 together form a relief valve 120 integrated to the female element 10 and which makes it possible to selectively close off a duct 121 for the flow of a fluid inside the female element 10, from the pipe $C_1$ towards the male element 20, in coupled configuration of the elements 10 and 20.

The valve 110 is provided with an O-ring seal 122 intended to can to sealingly abut against the seat 118 in closed configuration of the relief valve 120 shown in FIGS. 1 to 4 and 7. Note 111 the front face of the valve 110 which is flat. This front face 111 is flush with the front face 108 when the valve 110 is in closed position of the relief valve 120.

The element 10 further comprises a manoeuvring ring 130 that is mounted radially around the body 102 in relation to the axis X10. The manoeuvring ring 130 defines an inner wall 131 turned towards the axis X10 and comprises a rear edge 132 folded back towards the axis X10 and which comes to abut against an external peripheral heel 124 of the body 102 in the configuration of FIGS. 1 and 2. This limits the movement of the ring 130 towards the front.

The ring 130 further comprises a front end 134 that forms a mouth E10 for the partial reception of the male element 20. This front end 134 is provided with three internal radial teeth 136 formed by localised radial allowances of the end 134 and which each extend, over an angular sector a136 of a magnitude 35°, in the direction of the axis X10. In practice, the value of the angle α136 can be between 20° and 60°. The teeth 136, are regularly distributed about the axis X10.

The ring 130 comprises three oblong holes 138 of which the largest dimension is parallel to the axis X10 and which are regularly distributed about the axis X10 and each one aligned axially with a tooth 136.

The ring 130 is provided, on its external radial surface with flutes 140 facilitating the grasping of it and the application of a torque on this ring. These flutes are arranged in a localised allowance 141 of the ring 130.

The female element 10 further comprises a safety ring 150 that is lodged, radially in relation to the axis X10, between the body 102 and the ring 130. This safety ring 150 extends between a rear edge 152 and a front edge 154 provided with three axial teeth 156 that extend towards the front in relation to the edge 154, each over an angular sector of an angle at the top β156 of which the value is equal to that of the angle α136. As such, in the configuration of the coupling shown in FIGS. 1, 2 and 7, the teeth 136 and 156 can be aligned with one another, with the teeth 136 coming as a covering of the teeth 156 over the front of the element 10. In other terms, in this configuration, the teeth 136 extend, radially from the outside of the ring 150, to the front of the teeth 156.

Note 164 the front face of the ring 150. The teeth 156 extend beyond the front face 164 in relation to the edge 154 of the main portion of the ring 150. The front face 164 has a radial width greater than the radial width of the teeth 136. In other terms, an internal radial portion 164A of the front face 164 is locally surrounded by the teeth 156.

The safety ring 150 further comprises three helical grooves 158 which are transversal, i.e. they extend radially through the entire thickness of the ring 150. These grooves are regularly distributed about the axis X10. Each helical groove extends between a first notch 160 and a second notch 162. The notches 160 and 162 are respectively aligned on the axes X160 and X162 parallel to the axis X10.

The female element 10 further comprises a drive ring 170 inserted, radially in relation to the axis X10, between the body 102 and the safety ring 150. The drive ring 170 is installed, on the body 102, between a rear heel 126 and a front heel 128 belonging to the body 102. The axial length of the space defined between the heels 126 and 128 for the receiving of the ring 170 is substantially equal, i.e. equal to the nearest operating clearance, to the axial length of the ring 170. As such, the ring 170 is immobilised axially along the body 102. Moreover, this ring 170 is mounted with the possibility of rotation around the body 102. The ring 170 is provided with three pins 178 regularly distributed about the axis X10 and each engaged in one of the grooves 158 and in one of the holes 138. The pins 178 are monoblock with the ring 170.

A spring 180 is inserted axially between the heel 124 and the safety ring 150 that is pushes back elastically towards the front of the element 10.

Figure 2:
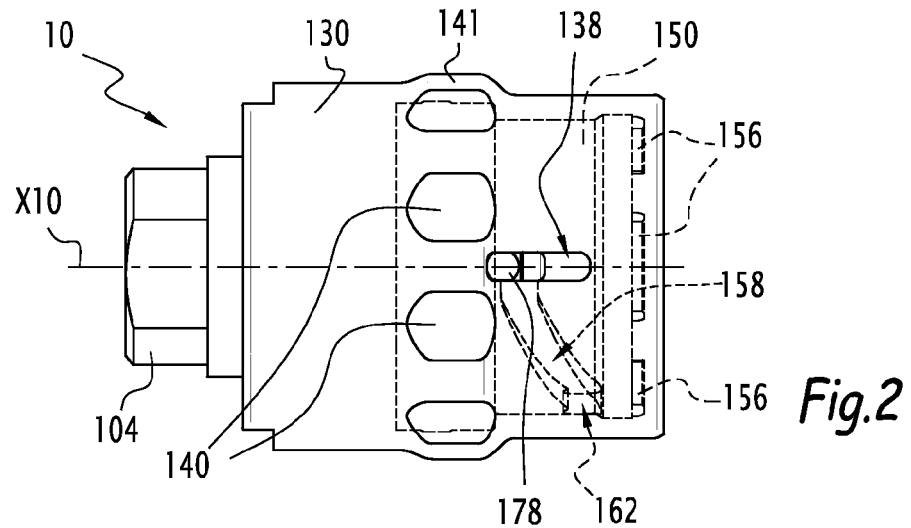
FIG. 2 is a side view, in the direction of the arrow II in FIG. 1 and on a smaller scale, of the female element, with visualisation of a safety ring as a dotted line.

In the configuration of FIGS. 1, 2 and 7, the teeth 156 of the safety ring 150 transmit the force of the elastic thrust of the spring 180 to the teeth 136 of the ring 130 against which they are abutting. The manoeuvring ring 130 is as such pushed towards the front, until its rear edge 132 is thrust against the heel 124.

The front of the male element is defined as the side of this element turned towards the female element in the configuration of FIGS. 1 and 7.

The male element 20 comprises a body 202 centred on an axis X20 and which extends between a proximal end 204 in relation to the pipe $C_2$ and a distal end 206. The distal end 206 defines a flat front face 208 which radially surrounds a valve 210, which in turn surrounds a plunger 212 integral with the body 202 and centred on the axis X20. The plunger 212 is mounted in the body 202 by screwing or another technique. It is connected to a body 202 by prongs of which one can be seen in the cut plane of FIG. 5, with the reference 213.

A spring 216 elastically charges the valve 210 in the direction of a seat 218 formed by the plunger 212 and which has the shape of a tapered surface centred on the axis X20 and diverging towards the front of the element 20. The valve 210 and the plunger 212 as such form a relief valve 220 making it possible to selectively close off a duct 221 for the flow of the fluid inside the body 202.

The valve 210 is provided with a seal 222 intended to abut against the seat 218 in closed configuration of the relief valve 220.

Moreover, the valve 220 is provided with a second joint 223 intended to receive as abutment the front face 108 of the body 102 in coupled configuration of the elements 10 and 20.

The body 202 is provided with an external peripheral collar 224 which is arranged on the outside of the body 202 and surrounds the latter over its entire periphery.

In the vicinity of the end 206, the body 202 is provided with an internal spherical channel wherein is received an O-ring seal 225.

The body 202 comprises three external radial teeth 226 regularly distributed about the axis X20 and which extend, on the distal end 206, radially towards the outside of the body 202. Each of these teeth extend over an angular sector of which the angle at the top γ226 is of a magnitude of 60°. As such, between each pair of two adjacent teeth 226, a zone 227 with an outer radius smaller than the outer radius of the teeth 226 is defined. A radial notch structure 226, 227 is thus formed around the front face 208 of the body 202.

The respective dimensions of the teeth 136 and 156, on the one hand, and 226, on the other hand, are chosen so that the teeth 136 and 156 can be inserted into the zones 227 which as such form zones for receiving these teeth 136 and 156.

A portion of a channel 228 is defined between each of the teeth 226 and the collar 224. In other terms, a peripheral channel 228 extends around the body 202 between the teeth 226 and the collar 224, with this channel 228 being interrupted on the zones 227 for receiving teeth 136 and 156.

In uncoupled configuration of the coupling shown in FIGS. 1, 2 and 7, the valves 110 and 210 are respectively pushed back against the seats 118 and 218. Moreover, the spring 180 pushes back the rings 150 and 130 towards the front of the element 10 and the pins 178 are engaged in the first notches 160 of the grooves 100.

In this configuration, the pins 178 render integral in rotation the rings 150 and 170 since the notches 160 have a width 1160, measured according to an orthoradial direction in relation to the axis X10, which is equal, to the nearest clearance, to the width 1178 of the pins 178 also measured according to an orthoradial direction. Moreover, as the pins 178 are engaged in the holes 138 and as the width of the holes is substantially equal to the width 1178, the rings 170 and 130 are also integral in rotation.

Figure 4:
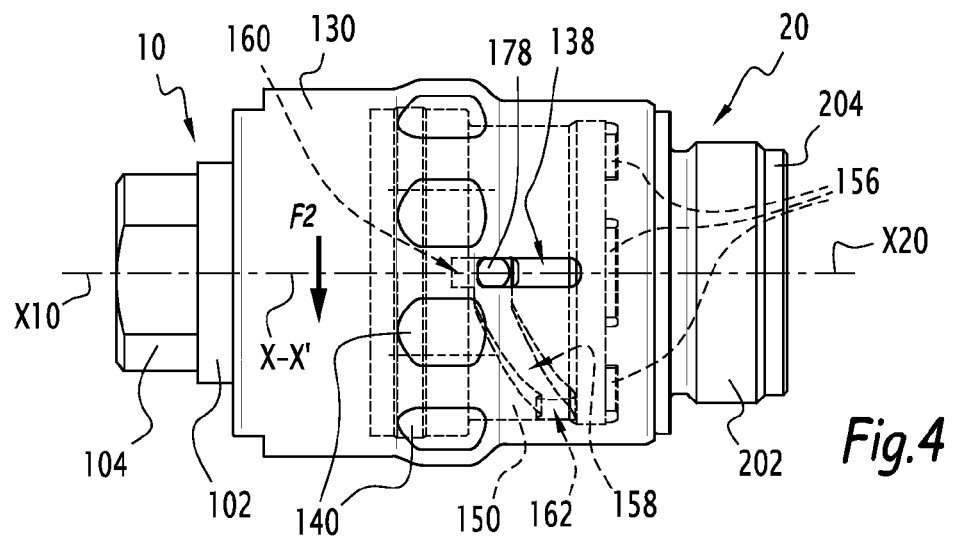
FIG. 4 is a side view, on a smaller scale and in the direction of the arrow IV in FIG. 3, of the elements of the coupling.

When the elements 10 and 20 are brought closer to one another in order to couple them, this is reached in the configuration of FIGS. 3 and 4 wherein the teeth 136 and 156 of the rings 130 and 150 are engaged in the zones 227 of the male element 20. This engagement takes place thanks to an essentially axial movement of the elements 10 and 20 towards one another, along a press fitting axis X-X' which is common to the elements 10 and 20 of the coupling and whereon are aligned the axes X10 and X20. This movement is shown by the arrows F1 in FIG. 1.

In practice, the teeth 136 pass through the zones 227 in order to reach beyond the teeth 226 in relation to the front face 208. The teeth 156 remain engaged in the zones for receiving 227. As long as the teeth 156 remain in the zones for receiving 227, i.e. in the configurations of FIGS. 3 to 6 and in the intermediate configurations, the ring 150 is immobilised in rotation, about the axis X-X', in relation to the body 202.

In the configuration of FIG. 3, the front face 164 of the ring 150 is abutting, via its portion 164A against the front face 208 of the body 202. This has for effect to push back the ring 150 inside the manoeuvring ring 130, around the body 102 and against the action of the spring 180, which can be seen in FIG. 3 by the bringing closer of the rear edge 152 of the ring 150 with regards to an internal shoulder 139 of the ring 130 and by the bringing closer of the edge 154 and of the surface 108.

This axial displacement of the safety ring 150 in relation to the manoeuvring ring 130 and to the body 102 has for effect to also displace this safety ring in relation to the drive ring 170, to the extent that the pins 178 exit the notches 160 and are engaged in the helical grooves 158. In other terms, in this position of FIGS. 3 and 4, the pins 178 can slide in the helical grooves 158 without being blocked in rotation.

Note that, in this position, the front face 108 of the body 102 is not in contact with the male element 20 and that the front face 214 of the plunger 212 is not in contact with the valve 110. As such, in this position, the relief valves 120 and 220 are in closed configuration of the internal ducts 121 and 221 of the elements 10 and 20.

In this position, the teeth 136 surround and centre the front face 208 on the surface 164A, which guarantees a good alignment of the axes X10 and X20 on the axis X-X'.

Furthermore, the body 102 can be considered, to the nearest operating clearance, as centred on the axis X10. As such, the surface 108 is normally centred on the front face of the valve 210 and, in terms of the coupling of elements 10 and 20, the seal 223 operates solely in compression.

The operator is aware that this position has been reached because the elastic force due to the spring 180 can be perceived by manipulating the element 10, during the retraction of the ring 150 in relation the rings 130 and 170.

Starting from this configuration, it is possible for the operator to exert a torque about the axis X-X', in the direction of the arrow F2 in FIG. 4, which has for effect to make the pins 178 progress in the channels 158 in the direction of the notches 162. This also has for effect to rotate the teeth 136 in relation to the body 202 and to engage these teeth in the portions of the channel 228, i.e. at the rear of the teeth 226 in relation to the front face 208. The engagement of the teeth 136 in the portions of channel 228 combined with the radial centering of the teeth 226 on the inner wall 131 of the manoeuvring ring 130 guarantees a good alignment of the axes X10 and X20 on the axis X-X', during the phase of coupling and in coupled configuration, in order to maintain the seal 223 in contact with the front face 108 of the body 102. By progressing in the grooves 158 towards the notches 162, the pins are displaced towards the front of the element 10 and drive with them the rest of the ring 170 and, via the same, the body 102 which advances axially in the direction of the body 202 in relation to the ring 130, as shown by the arrows F3 in FIG. 3. Thanks to this movement, the front face 108 pushes back the valve 210, while the valve 110 comes to abut against the plunger 212 and is pushed back by the latter, in order to reach the configuration of FIGS. 5 and 6 wherein the elements 10 and 20 are coupled and the relief valves 120 and 220 open, which allows for the flow of fluid as shown by the arrows E in this figure. In this configuration, the front face 108 rests against the seal 223 which works solely in compression and which provides the function of a seal, between, on the one hand, the volume of circulation of the fluid formed by the ducts 121 and 221 and, on the other hand, the exterior of the coupling 2. The seal 225 then abuts against the external radial surface of the end 106 and also provides a function of a seal.

In this configuration, the pins 178 have reached the notches 162 of the grooves 158 where they are locked in rotation thanks to the elastic force generated by the spring 180.

As such, the locking of the male and female elements onto one another takes place by means of a rotation of the manoeuvring ring 130 in relation to the ring 150, over an angular range corresponding to the displacement of the pins 178 along grooves 158. This angular range is about 90°. That is why the coupling 2 can be qualified as a quarter-turn connection.

Figure 6:
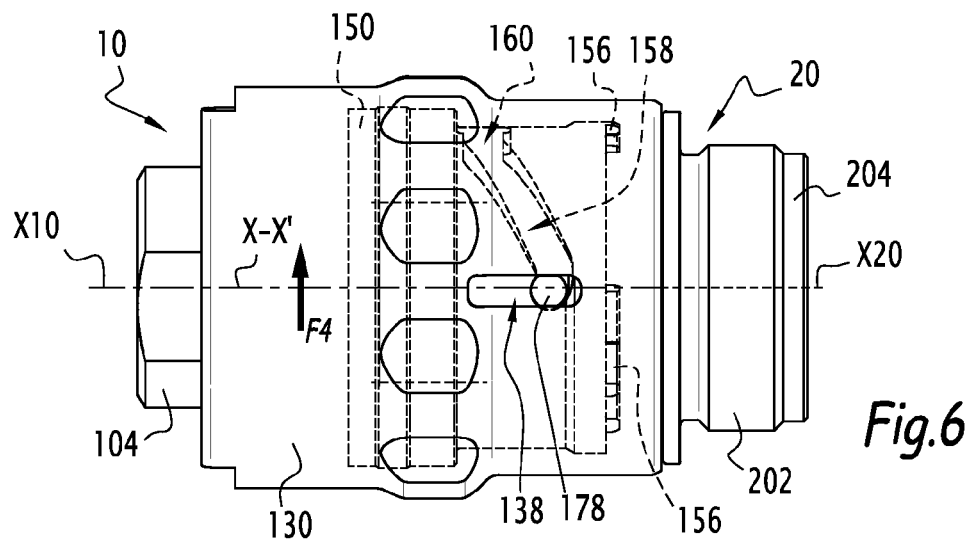
FIG. 6 is a side view, on a smaller scale and in the direction of the arrow VI in FIG. 5, of the elements of the coupling.

As can be noted when comparing FIGS. 4 and 6, the axial progression of the body 102 in the direction of the body 202 can be located by the operator thanks to the displacement of the pins 178 in the holes 138. These holes and these pins therefore make it possible to visualise the position of the safety ring 150 and of the body 102 in relation to the body 202 and to the manoeuvring ring 130, through this ring.

It is understood that the manipulation of the coupling 2 for the coupling of the elements 10 and 20 is particularly easy, although these elements are compact, in particular according to their respective axial dimensions. The coupling sequence guarantees a positioning and correct axial orientation of the male and female elements, by the cooperation of the teeth 136, 156 and 226, which makes it possible to trigger in a secure and tight manner the opening of the relief valves 110 and 210, with short axial travel. The forms of the rings 130 and 150 and the geometry of the body 202 naturally guide the operator in order to facilitate the coupling manoeuvre. It is remarkable that the locked position of the male and female elements of the coupling is provided before the opening of the relief valves 110 and 210 which takes place in the same movement by rotation of the manoeuvring ring, with this rotation also corresponding to the effective locking of this manoeuvring ring on the male element, by engagement of these teeth 136 in the portions of the channel 228.

Also note that, in the configuration of FIG. 3, the flow E of the fluid is not hindered by means for guiding the valves 110 and 210. In other terms, the fluid stream is hardly obstructed, which facilitates the flow of the fluid in coupled configuration.

Moreover, the male element 20, which is generally mounted on an automobile vehicle in the case of a supply system of such a vehicle, is the simplest of the elements of the coupling. It can be produced in a large number of copies, therefore at least cost. As the central plunger 212 is fixed in relation to the body 202, the ill-intentioned intrusion of a tool into the circuit to which the pipe $C_2$ belongs to is limited, even rendered impossible.

Moreover, the body 102 is free to rotate in relation to the rings 130, 150 and 170. As such, if a torque is exerted by the pipe $C_1$ on the body 102, for example in the case where this pipe is flexible and partially wound, this does not have a negative influence on the manoeuvre of the coupling 2 during the coupling and uncoupling phases.

For the uncoupling, it is sufficient for the operator to exert on the ring 130 a torque F4 in a direction opposite the torque F2 in order to axially eject the pins 178 from the notches 162 then have the pins progress in the grooves 158, until reaching the configuration of FIGS. 3 and 4. It is then sufficient to pull axially on the tips 10 and 20 in order to separate them from one another, with the assistance of the spring 180, which again engages the pins 178 in the notches 160.

Figure 10:
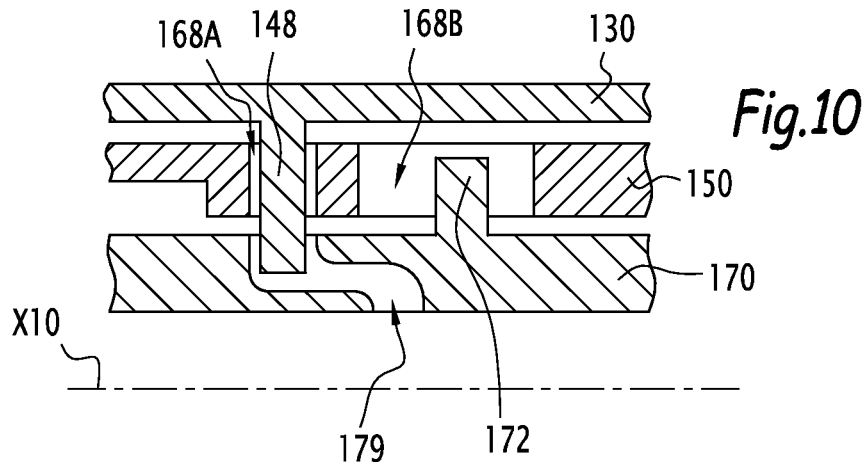
FIG. 10 is a partial cross-section corresponding to the detail X in FIG. 1 for a female element and a coupling in accordance with a second embodiment of the invention.
Figure 11:
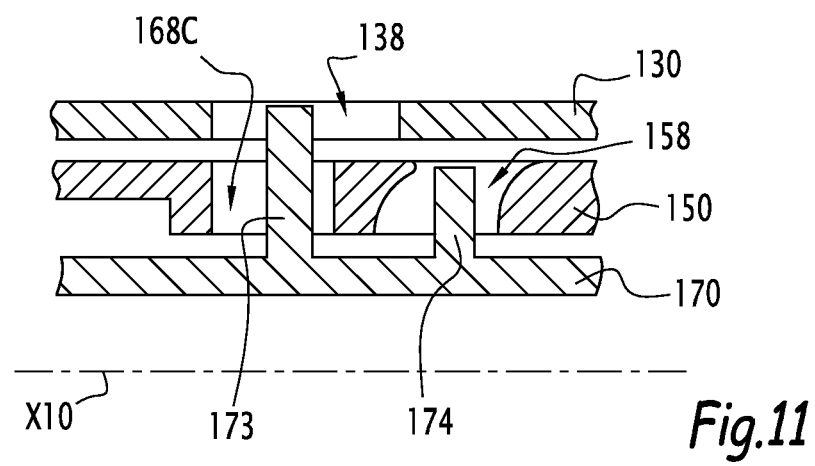
FIG. 11 is a cross-section similar to FIG. 10 for a coupling element and a coupling in accordance with a third embodiment of the invention and FIG. 12 is a cross-section similar to FIG. 10 for a coupling element and a coupling in accordance with a fourth embodiment of the invention.
Figure 12:
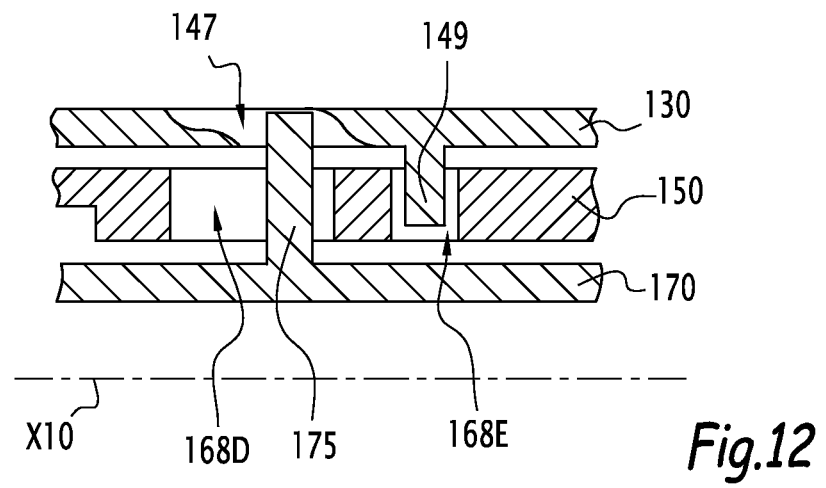

In the second, third and fourth embodiments of the invention shown in FIGS. 10 to 12, the elements similar to those of the first embodiment bear the same references. In what follows, only what distinguishes these embodiments from the first one is described. These embodiments have alternative means for transforming, when the safety ring 150 is in its second position, a movement of rotation of the manoeuvring ring 130 about the longitudinal axis X10 and in relation to the safety ring 150, into a movement of axial translation of the body 102 in relation to the manoeuvring ring 130.

In the second embodiment of FIG. 10, locking pins 148 are provided on the manoeuvring ring 130 and each extend, through an L-shaped opening 168A arranged in the safety ring 150, to a helical groove 179 arranged in the drive ring 170 which is immobilised in relation to the body 102 of the female element axially, while still free to rotate. The opening 168A has a branch parallel to the axis X10 and a branch that extends according to an orthoradial direction in relation to this axis. Moreover, a pin 172 monoblock with the ring 170 is engaged on a longitudinal groove 168B of the safety ring 150, which ensures being integral in rotation of the rings 150 and 170, while still allowing for a relative axial displacement of these rings.

In the third embodiment of FIG. 11, the drive ring 170 is provided with two pins 173 and 174. The first pin 173 passes through a recess 168C of the safety ring 150 and is engaged in a longitudinal hole 138 of the manoeuvring ring 130. Moreover, the second pin 174 of the drive ring 170 is engaged in a helical groove 158 of the safety ring 150.

Alternatively, the recess 168C can be replaced by a helical groove.

In the fourth embodiment of FIG. 12, the drive ring 170 is provided with a pin 175 which passes through a longitudinal groove 168D of the safety ring 150 and is engaged in a helical groove 147 of the manoeuvring ring 130. Moreover, this manoeuvring ring 130 is provided with a pin 149 which is engaged in an annular groove 168E of the safety ring 150.

In the second to fourth embodiments, two protruding members 148 and 172, 173 and 174, 149 and 175 are provided. They can be arranged in any order in relation to the mouth E10 of the female element. In other terms, the right/left position of these elements in FIGS. 10 to 12 could be inverted.

The operations of these embodiments can be compared to those of the first embodiment.

Regardless of the embodiment, the number of pins 178 or equivalents can be different from three. More preferably, at least two pins are provided in order to cooperate with at least two helical grooves in order to drive the body of the female element in axial translation. However, a version with a single pin 178 or equivalent can be considered.

Likewise, the number of teeth of the manoeuvring ring and of the safety ring can be different from three. It is advantageously greater than or equal to two.

The number of teeth of the male element can also be different from three, more preferably greater than or equal to two.

Regardless of the embodiment, mirror solutions can be considered for the positioning of the members for fastening in rotation and in guiding in the helical movement, on the one hand, and associated channels, on the other hand. In other terms, these members and channels can, as chosen, be arranged on an inner or outer ring of the female element 10.

Note that the teeth 136, 156 and 226 have several functions, namely:
 a foolproof function in order to assist in the axial alignment of the male and female elements 10 and 20 for the purposes of their coupling;
 a centering function in order to maintain the alignment of the male and female elements in the coupling phase and in coupled position;
 a function of coupling the male element 20 with the safety ring 150;
 a function of the pushing the safety ring 150 in relation to the manoeuvring ring 130;

The drive ring 130 is mounted slidingly between two shoulders around the body 102 in order to not bring it into rotation in its helical movement and limiter the torsion of connecting elements at the rear of the body. According to an alternative not shown of the invention, the drive ring 130 can be integral with the body 102. The body 102 is then brought towards the front during the coupling of the elements 10 and 20, with a helical movement. In this case, a rotating connection element on the proximal end 104 of the body 102 can be provided in order to allow for the connection of a flexible pipe $C_1$, not subjected to the rotation movement of the body 102.

According to alternatives not shown of the invention, the pins 178 and equivalents can be replaced with rollers or added parts, for example screwed, on one or the other of the rings.

The foolproof and centering functions provided by the teeth 136, 156 and 226 could be provided by other means. Other forms of teeth can also be considered.

The invention can be applied in fields other than the automobile industry, in particular for the supply of train sets or aircraft for which a short male coupling element is provided mounted directly on the partition of a reservoir.

The embodiments of the alternatives considered hereinabove can be combined together in order to generate ne embodiments of the invention.

The invention claimed is:

1. A female quick coupling element configured to cooperate, by press fitting along a press fitting axis, with a male quick coupling element and comprising:
    a body centered on a longitudinal axis, defining a duct for the passage of fluid and comprising, at its distal end, a flat front face,
    a relief valve comprising a valve lodged in the duct for the passage of fluid and mobile along the longitudinal axis in relation to the body, between a closed position of the relief valve, abutting against a seat of the relief valve, and an open position of the relief valve, separated from the seat,
    a manoeuvring ring mounted slidingly around the body and defining, at a distal end of said manoeuvring ring, a mouth for receiving the male element, with the ring provided with one relief configured for engagement with a corresponding relief of the male quick coupling element,
    wherein the female coupling element further comprises
    a safety ring mounted around the body, radially inside the manoeuvring ring, the safety ring being mobile axially in relation to the body between a first position, where the manoeuvring ring and the safety ring are integral in rotation about the longitudinal axis, and a second position where the manoeuvring ring can rotate about the longitudinal axis in relation to the safety ring,
    a movement transforming means for transforming, when the safety ring is in its second position, a movement of rotation of the manoeuvring ring about the longitudinal axis and in relation to the safety ring, into a movement of axial translation of the body in relation to the manoeuvring ring.

2. The female quick coupling element according to claim 1, wherein the movement transforming means comprise a drive ring mounted mobile in rotation and integral in translation around a body, wherein one of the manoeuvring ring and the drive ring is provided with at least one member for fastening in rotation the drive ring with the manoeuvring ring, and being capable of relative axial movement, and wherein one of the drive ring and the safety ring is provided with at least one member for guiding the drive ring in a helical movement in relation to the safety ring.

3. The female quick coupling element according to claim 2, wherein the member for fastening in rotation and the member for guiding are integral or monoblock with the same ring.

4. The female quick coupling element according to claim 3, wherein the member for fastening in rotation and the member for guiding are confounded into the same member.

5. The female quick coupling element according to claim 2, wherein the member for fastening in rotation and the member for guiding are two separate members.

6. The female quick coupling element according to claim 5, wherein the member for fastening in rotation and the member for guiding are integral or monoblock with two separate rings selected from a group of rings consisting of the manoeuvring ring, the safety ring and the drive ring.

7. The female quick coupling element according to claim 2, wherein the member for fastening in rotation is a pin integral or monoblock with one of the rings and engaged in a groove at least in the longitudinal portion of another of the rings, parallel to the longitudinal axis of the body, and the member for guiding is a pin integral or monoblock with one of the rings and engaged in a helical groove of another of the rings.

8. The female quick coupling element according to claim 7, wherein, the member for fastening in rotation and the member for guiding are confounded into the same member and, in the first position of the safety ring, the pin for fastening in rotation and guiding is engaged in a notch that extends the helical groove and which extends parallel to the longitudinal axis of the body.

9. The female quick coupling element according to claim 1, wherein the movement transforming means comprise a drive ring mounted mobile in rotation and integral in translation around a body, wherein one of the safety ring and the drive ring is provided with at least one member for fastening in rotation the drive ring with the safety ring and being capable of relative movement, and wherein one of the drive ring and the manoeuvring ring is provided with at least one member for guiding the drive ring in a helical movement in relation to the manoeuvring ring.

10. The female quick coupling element according to claim 9, wherein the member for fastening in rotation and the member for guiding are integral or monoblock with the same ring.

11. The female quick coupling element according to claim 10, wherein the member for fastening in rotation and the member for guiding are confounded into the same member.

12. The female quick coupling element according to claim 9, wherein the member for fastening in rotation and the member for guiding are two separate members.

13. The female quick coupling element according to claim 12, wherein the member for fastening in rotation and the member for guiding are integral or monoblock with two separate rings selected from a group of rings consisting of the manoeuvring ring, the safety ring and the drive ring.

14. The female quick coupling element according to claim 9, wherein the member for fastening in rotation is a pin integral or monoblock with one of the rings and engaged in a groove at least in the longitudinal portion of another of the rings, parallel to the longitudinal axis of the body, and the member for guiding is a pin integral or monoblock with one of the rings and engaged in a helical groove of another of the rings.

15. The female quick coupling element according to claim 14, wherein the member for fastening in rotation and the member for guiding are confounded into the same member and, in the first position of the safety ring, the pin for fastening in rotation and guiding is engaged in a notch that extends the helical groove and which extends parallel to the longitudinal axis of the body.

16. The female quick coupling element according to claim 1, further comprising means for elastically returning the safety ring towards its first position.

17. The female quick coupling element according to claim 1, wherein, when the safety ring is in its second position and as long as the manoeuvring ring has not rotated about the longitudinal axis in relation to its angular position with regards to the safety ring when the safety ring is in its first position, a distal end of the safety ring protrudes beyond the front face of the body.

18. The female quick coupling element according to claim 1, wherein the valve is provided with a flat front face flush with the flat front face of the body when the valve is in closed position of the relief valve.

19. The female quick coupling element according to claim 1, wherein the seat is formed by an internal tapered surface of the body, converging towards the longitudinal axis in the direction of the front of the female element.

20. A quick coupling for the joining of two fluid pipes, wherein the quick coupling comprises the female quick coupling element according to claim 1 and the male quick coupling element complementary with the female element.

21. The quick coupling according to claim 20, characterised
in that the male quick coupling element comprises:
a second body centred on a second longitudinal axis and defining a second duct for the passage of fluid,
a second relief valve comprising a second valve lodged in the second duct for the passage of fluid and mobile along the second longitudinal axis in relation to the second body, between a closed position of the second relief valve, abutting against a seat of the second relief valve formed by the second body, and an open position of the second relief valve, separated from the seat,
and in that the second body is provided with at least one relief for immobilising in rotation the safety ring, during press fitting of the male and female quick coupling elements and in coupled configuration.

22. The quick coupling according to claim 20, wherein, when the safety ring is in its second position and as long as the manoeuvring ring has not rotated about the longitudinal axis of the body of the female quick coupling element in relation to the angular position with regards to the safety ring when the safety ring is in its first position, the safety ring constitutes an abutment to the bringing together of the manoeuvring ring and of the male quick coupling element.

* * * * *